United States Patent
Meier et al.

(10) Patent No.: US 11,522,778 B2
(45) Date of Patent: Dec. 6, 2022

(54) METHOD FOR DETERMINING A SYNCHRONIZATION ACCURACY, COMPUTER PROGRAM, COMMUNICATION UNIT AND MOTOR VEHICLE

(71) Applicant: Volkswagen Aktiengesellschaft, Wolfsburg (DE)

(72) Inventors: Alexander Meier, Wolfsburg (DE); Olaf Krieger, Lostau (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 57 days.

(21) Appl. No.: 17/055,093

(22) PCT Filed: Apr. 17, 2019

(86) PCT No.: PCT/EP2019/059888
§ 371 (c)(1),
(2) Date: Nov. 12, 2020

(87) PCT Pub. No.: WO2019/219316
PCT Pub. Date: Nov. 21, 2019

(65) Prior Publication Data
US 2021/0218656 A1      Jul. 15, 2021

(30) Foreign Application Priority Data
May 17, 2018   (DE) ............... 10 2018 207 684.7

(51) Int. Cl.
*H04L 43/0864*   (2022.01)
*H04J 3/06*   (2006.01)
(Continued)

(52) U.S. Cl.
CPC ........ *H04L 43/0864* (2013.01); *H04J 3/0667* (2013.01); *H04J 3/14* (2013.01);
(Continued)

(58) Field of Classification Search
CPC ................ H04L 43/0864; H04L 12/40; H04L 2012/40215; H04L 2012/40273; H04J 3/0667; H04J 3/14; H04W 4/40
See application file for complete search history.

(56) References Cited

U.S. PATENT DOCUMENTS

| | | | |
|---|---|---|---|
| 7,385,878 B2 * | 6/2008 | Cho ...................... | G04G 21/04 455/566 |
| 8,510,594 B2 | 8/2013 | Paulsburg et al. ............. | 714/5.1 |

(Continued)

FOREIGN PATENT DOCUMENTS

| | | | | |
|---|---|---|---|---|
| DE | 102008026574 A1 | 12/2009 | ............. | G06F 11/20 |
| DE | 102014214274 A1 | 1/2016 | ........... | H04L 12/701 |

(Continued)

OTHER PUBLICATIONS

German Office Action, Application No. 102018207684.7, 7 pages, dated May 4, 2021.

(Continued)

*Primary Examiner* — Chandrahas B Patel
(74) *Attorney, Agent, or Firm* — Slayden Grubert Beard PLLC

(57) ABSTRACT

The present invention relates to a method for determining a synchronization accuracy of a time synchronization of a first communication unit. A time request is sent via a communication channel at a corresponding instant of time of transmission from the first communication unit to a second communication unit. The method comprises receiving a time response at the first communication unit, the time response providing a synchronization time information for the second communication unit. The synchronization accuracy is determined based on the instant of time of transmission and the instant of time of reception.

17 Claims, 3 Drawing Sheets

(51) Int. Cl.
*H04J 3/14* (2006.01)
*H04L 12/40* (2006.01)
*H04W 4/40* (2018.01)

(52) U.S. Cl.
CPC .... *H04L 12/40* (2013.01); *H04L 2012/40215* (2013.01); *H04L 2012/40273* (2013.01); *H04W 4/40* (2018.02)

(56) References Cited

U.S. PATENT DOCUMENTS

| | | | |
|---|---|---|---|
| 9,112,630 B1 | 8/2015 | Mizrahi | |
| 10,673,551 B2* | 6/2020 | Qiao | H04L 29/06 |
| 10,778,359 B2* | 9/2020 | Wang | H04J 3/0655 |
| 2012/0250704 A1 | 10/2012 | Yamada et al. | 370/503 |
| 2016/0034363 A1 | 2/2016 | Poledna | 714/4.2 |
| 2017/0195109 A1 | 7/2017 | Perez-cruz et al. | |

FOREIGN PATENT DOCUMENTS

| | | | | |
|---|---|---|---|---|
| DE | 102014214823 A1 | 2/2016 | | H04L 7/04 |
| DE | 102014217993 A1 | 3/2016 | | H04L 7/04 |
| DE | 102014222216 A1 | 5/2016 | | H04L 1/00 |
| DE | 2019/219316 A1 | 11/2019 | | H04J 3/06 |
| DE | 102018207684 A1 | 11/2019 | | H04L 7/04 |
| WO | 2014/138767 A1 | 9/2014 | | G05B 19/042 |

OTHER PUBLICATIONS

International Search Report and Written Opinion, Application No. PCT/EP2019/059888, 19 pages, dated Jul. 24, 2019.

* cited by examiner

METHOD FOR DETERMINING A SYNCHRONIZATION ACCURACY, COMPUTER PROGRAM, COMMUNICATION UNIT AND MOTOR VEHICLE

CROSS-REFERENCE TO RELATED APPLICATIONS

This application claims priority to German Patent Application No. DE 10 2018 207 684.7, filed on May 17, 2018 with the German Patent and Trademark Office. The contents of the aforesaid Patent Application are incorporated herein for all purposes.

TECHNICAL FIELD

The present invention relates to a method and a computer program for determining a synchronization accuracy of a communication unit, a communication unit and a motor vehicle. The invention also relates to a communication unit which is configured to be connected to a communication channel.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In communication systems or information systems, it may be necessary to implement trustworthy time synchronization between distributed components or communication units of the respective system in order to ensure system functionality. It may be necessary to implement the time synchronization in a trustworthy manner with regard to functional security or manipulation security. For example, it is possible to achieve reliable or trustworthy time synchronization with a communication channel that has at least one automotive safety integrity level (ASIL) ASIL B (or a higher level). A communication channel used in a communication system, via which the time synchronization between communication units takes place, may however not be implemented in a trustworthy manner, for example it does not meet the ASIL B requirements.

A communication system may be used in vehicles, e.g. for the area of automated driving with corresponding sub-functions such as sensor data fusion. Communication units that synchronize in time may e.g. be control units or sensors of the vehicle.

One possibility of realizing trustworthy time synchronization would be to implement every communication channel used between the communication units in a consistently trustworthy manner (for example in accordance with ASIL B). However, this option is costly and may be uneconomical. For some areas of application, there may be no suitable hardware components for implementing a communication channel that is trustworthy in terms of functionality security. A communication channel with low trustworthiness can, for example, have an undue time delay or latency at random points in time, with which no trustworthy time synchronization is possible.

SUMMARY

An object exists to provide improved concepts for time synchronization between communication units which are connected via a communication channel.

The object is achieved according to the independent claims. Embodiments are described in the dependent claims, the following description, and the FIGS.

DETAILED DESCRIPTION

Figure 1:
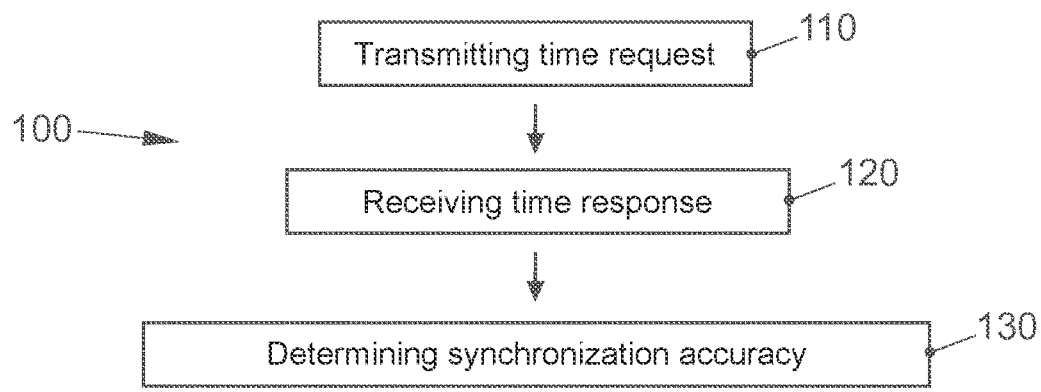
FIG. 1 shows a schematic representation of an exemplary method.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

One exemplary aspect relates to a method for determining a synchronization accuracy of a time synchronization of a first communication unit. According to the method, the first communication unit sends a time request to a second communication unit. The time request is sent via a communication channel at a corresponding instant of time of transmission. A time response is received at the first communication unit after the time request has been sent. The time response may be sent by the second communication unit after it has received the time request. The time response includes a synchronization time specification of the second communication unit. The time response is received at the first communication unit at a corresponding instant of time of reception. The synchronization accuracy is determined based on the instant of time of transmission and the instant of time of reception.

The communication channel may belong to a system, for example a communication system, which has a plurality of communication units. The first and the second communication unit (as well as further communication units) may be connected to the communication channel. For example, the first and the second communication unit may be configured to implement together a system function, in which case they must be synchronized in time. The first and the second communication unit each have a local timer, for example a local clock. The timer may indicate a time, or it may be provided by a counter which outputs monotonically increasing values at a predetermined frequency. By means of the time synchronization, the timer of the first communication unit may be adapted to the timer of the second communication unit. In order to ensure the functionality of the system, a time synchronization with a predetermined accuracy may be necessary. In some situations, the predetermined accuracy cannot be achieved, for example due to time delays in the transmission of messages via the communication channel.

The communication channel used may be configured in such a way that successive time synchronizations of the first communication unit with the second communication unit each have a different accuracy. In other words, the communication channel may cause a random fluctuation in the synchronization accuracy, for example because it is not trustworthy. For example, the communication channel does not provide any information, whether it is trustworthy and if it could limit the accuracy of the synchronization because of a time delay. For example, delay times and thus the synchronization accuracy may vary on an untrustworthy communication channel as a function of a load unknown to the first communication unit or the current use of the communication channel.

The method of some embodiments makes it possible to determine the accuracy with which synchronization has taken place. This may result in the benefit that even on untrustworthy communication channels it can be recognized which synchronization accuracy is achieved during synchronization. The method may be used, for example, to determine whether or not a predetermined accuracy of the synchronization has been achieved. One benefit of the method presented here can be a high level of efficiency, since only two messages have to be sent in order to determine the synchronization accuracy. Another benefit can be increased security against manipulation, since the messages sent are for example securely encrypted and/or may be provided with digital signatures and/or secure identification features, such that only messages intended for this purpose are used for time synchronization.

After sending the time request, the first communication unit may receive a time response from the second communication unit comprising the time specification of the second communication unit concerning the time of sending the time response. The time at which the time query was sent and the time at which the corresponding time response was received may be determined, for example, by or on the first communication unit. For example, the instants of time of receipt of all messages received at the first communication unit may be determined directly upon receipt and that instant of time of reception that corresponds to the time response of the second communication unit may be assigned after the time response has been read out. The time response contains the synchronization time, e.g. the local time of the second communication unit. The first communication unit may determine this from the time response and adapt the local time of the first communication unit to the synchronization time information.

From the instant of time of transmission and the instant of time of reception, the first communication unit may determine the accuracy of the synchronization, for example a maximum error by which the local time of the first communication unit may deviate from the local time of the second communication unit after the synchronization.

To determine the synchronization accuracy, according to one example, a round trip time is determined from the instant of time of transmission and the instant of time of reception. The round trip time results from the total time in which the time request is transmitted via the communication channel, the time which elapses between receiving the time request and sending the time response to the second communication unit, and the time duration in which the time response is transmitted via the communication channel. The round trip time indicates a maximum possible synchronization error and the synchronization accuracy may be determined based on the maximum synchronization error, e.g. by a ratio of the maximum synchronization error to a time resolution of the timer of the first communication unit. By determining the synchronization error, it is possible to use this for time synchronization, for example by subtracting the synchronization error for the time determination or time calculation on the first communication unit based on the synchronization time specification. If the synchronization error is used for determination of time, the timer of the first communication unit lags behind that of the second communication unit by the range from zero to at most the synchronization error. On the other hand, if the synchronization error is not used, it is known that the timer of the first communication unit is ahead of that of the second communication unit by the range from zero to at most the synchronization error. A benefit may be that the synchronization error may be used to determine the time and that thus the range of the maximum deviation (time procedure or time lag) is known.

One benefit of the method may be that, using the messages already provided for synchronization, it can be determined by what amount the time information on the first communication unit can differ from the time information on the second communication unit after synchronization. This way, the properties of the communication channel relevant for synchronization, such as a current time delay, may be monitored and errors or current unreliability of the communication channel may be detected. At the same time, it may be possible to prevent possible manipulations of the time synchronization by inserting cryptographic signatures in the time request and time response.

For example, a communication system with at least a first and a second communication unit may be provided in a vehicle. The communication units may be connected via a communication channel of the vehicle, a CAN bus (Controller Area Network) or an Ethernet network. The communication units may be control devices of the vehicle, sensors of the vehicle or actuators of the vehicle. For example, a sensor of the vehicle may synchronize with a control device of the vehicle in terms of time so that the control device may use sensor data from the sensor to perform a function.

In some embodiments, the synchronization time specification of the second communication unit is used to carry out a function of the first communication unit as a function of the determined synchronization accuracy. For the reliable execution of the function, it may be necessary that a predetermined synchronization accuracy is achieved. The predetermined synchronization accuracy may be achieved if the round trip time is less than a maximum predetermined time period (for example less than 5 ms, less than 1 ms, less than 0.5 ms or less than 0.1 ms). The timers of the communication units have a limited temporal resolution. It is possible that the predetermined synchronization accuracy is achieved if the round trip time is less than the temporal resolution of the timer of the first communication unit or corresponds to a maximum of the twofold, the fivefold or the tenfold of the temporal resolution.

In some embodiments, it is e.g. possible to execute the function only after a synchronization with the predetermined synchronization accuracy has taken place. For example, the function is prevented from being carried out if the predetermined synchronization accuracy is not achieved. A possible benefit is that e.g. execution of the function may be prevented if reliable time synchronization is not guaranteed. It is possible that during a first use of the communication channel the predetermined synchronization accuracy is not achieved, while the predetermined synchronization accuracy may be achieved during a second use of the communication channel.

In some embodiments, a new time request may be sent as a result of a predetermined synchronization accuracy not being achieved, for example if the synchronization accuracy is less than a synchronization accuracy required for the function to be performed. The first communication unit may send at least a second time request or further time requests via the communication channel, e.g. until the predetermined synchronization accuracy is achieved. For example, during a further synchronization process, the second utilization may be present on the communication channel, so that the predetermined synchronization accuracy may be achieved. The synchronization time information determined from the further synchronization process may be used by the first communication unit to synchronize the timer and the function may be carried out after the further synchronization process.

This may result in the benefit that functions requiring a predetermined synchronization accuracy for reliable execution of the function may also be reliably executed after a synchronization carried out via a communication channel that fluctuates, for example, with respect to a transmission delay or an unreliable communication channel. This is possible, for example, after several synchronizations have been carried out, as soon as the predetermined synchronization accuracy has been reached, which is checked according to some embodiments. One benefit of the proposed method may therefore be that requirements for reliability or quality requirements with regard to reliable functionality are not transferred to the communication channel. One benefit may exist in the possibility of realizing a trustworthy time synchronization during use of an untrustworthy communication channel, for example in the event that a sufficiently high synchronization accuracy is determined using the method. This enables cost savings, since cost-intensive implementation of a trustworthy communication channel may be dispensed with.

Some embodiments provide that a synchronization error determined from the synchronization accuracy is taken into account in dependence of the function to be carried out for the time synchronization. For example, the timer of the first communication unit may be set according to the synchronization time specification so that it follows the timing of the second communication unit by at most the synchronization error (for example the determined round trip time). Alternatively, the timer of the first communication unit may be set according to the synchronization time plus the determined synchronization error (for example, the round trip time), so that it precedes the timer of the second communication unit by at most the synchronization error. Alternatively, for example, half of the determined synchronization error may be added to the synchronization time specification, for example to increase the probability that the time specification of the first communication unit deviates from the time specification of the second communication unit by the smallest possible amount.

With some functions, it may be beneficial that the timer of the first communication unit runs fast with relation to the second communication unit, while with other functions, running slow with relation to the second communication unit is possible. For example, the first communication unit may be a sensor of a vehicle which determines a distance from an object towards which the vehicle is moving. The function may be to brake the vehicle before it collides with the object. For example, the vehicle does not collide with the object when the time indication of the first communication unit runs fast, since a distance greater than the actual distance to the object may be determined and the vehicle may be brought to a standstill at a greater distance. One benefit of the present embodiments may be to use the determined synchronization error in accordance with a function to be carried out.

In some embodiments, a time period between receiving the time query and sending the time response to the second communication unit is taken into account to determine the synchronization accuracy, which may be referred to as the dwell time. For example, the second communication unit determines the instant of time of reception of the time request. The second communication unit may determine the duration from an anticipated or planned instant of time of transmission of the time response and send it to the first communication unit together with the synchronization time information in the time response. For example, the second communication unit has a high level of functional safety, so that it is ensured that the time response is sent exactly (within the time resolution of the timer) at the planned instant of time of transmission. The dwell time may be inserted into the time response in order, for example, to provide the dwell time in a simple manner to the first communication unit. For example, the instant of time of reception of the time query and the instant of time of transmission of the time response may alternatively or additionally be inserted into the time response, so that the length of stay at the first communication unit may be determined. This way, the benefit of sending the time response more quickly may result. The first communication unit may determine and use the dwell time to determine the synchronization accuracy. The synchronization error corresponds at most to the round trip time minus the dwell time. The maximum synchronization error and thus the synchronization accuracy may thus beneficially be determined more precisely.

In some embodiments, an inaccuracy of the timer of the first communication unit compared to a timer of the second communication unit is compensated for by using a deviation rate. The deviation rate is determined based on at least one further sending of a time query and a corresponding further receiving of a time response. The deviation rate may be determined from a ratio of the instants of time of transmission of the respective time responses to the instants of time of reception of the respective time responses. By using the deviation rate, the accuracy of the time determination on the first communication unit may be adapted to the second communication unit. To determine the deviation rate, it is possible to use synchronization processes with the same round trip time and the same dwell time, for example the round trip time and/or dwell time may deviate from one another by less than 10% or less than 5%. The benefit of this may be that a synchronization between the communication units with a certain accuracy is maintained longer because the time information of the two communication units do not drift apart due to the different rate inaccuracies or a time drift apart is at least reduced. One benefit may be that this means that temporal synchronizations have to be carried out with a reduced frequency.

In some embodiments, a plurality of time queries is sent from the first communication unit via the communication channel to a corresponding plurality of communication units, which are configured accordingly at least with regard to sending the time response of the second communication unit. In other words, the first communication unit may determine synchronization time information of various communication units. For example, the first communication unit initially performs a function with a second communication unit. For example, the second communication unit may fail at a certain point in time. A third and a fourth communication unit, which are also connected to the communication channel, may be configured redundantly to carry out the same function. For example, the synchronization accuracy of the synchronization with the third communication unit is lower than the predetermined synchronization accuracy for executing the function, whereas the synchronization accuracy is achieved in the synchronization with the fourth communication unit. Because the first communication unit has already determined the synchronization time specification of the fourth communication unit, the function may be carried out immediately by the first communication unit and the fourth communication unit after the second communication unit fails. The benefit may be that by providing redundant time synchronizations in the event of a failure of a communication unit, an immediate switchover to or use of a further communication unit is possible.

According to some embodiments, if the synchronization time specification of the second communication unit deviates from a time specification of the first communication unit, the time specification of the first communication unit is gradually adapted to the synchronization time specification. For example, the time specification of the first communication unit may differ from the synchronization time specification by a multiple of the time resolution of the first communication unit. The gradual adaptation to the synchronization time specification may prevent discontinuities or jumps in the time specification of the first communication unit. For example, the gradual adjustment may take place within a predetermined period of time, for example within 1 ms, 5 ms, or within 1 second. For example, the duration of the gradual adjustment may be selected as a function of the determined deviation. For example, the period of time may be selected so that the gradual adjustment is completed by the next synchronization process. Jumps in the time indication may have a negative effect on some functions. With audio functions, jumps in the time information may increase a distortion factor. The further development may have the benefit that a jumping of the time indication is prevented during synchronization and thus the execution of functions is not impaired.

In some embodiments, a respective identification feature is added to the time request and the time response, by means of which a time response is uniquely assigned to a corresponding time request. The security of the method against manipulation may also be increased by the identification feature. For example, the identification feature may beneficially be cryptographically encrypted so that the origin of a respective message may be reliably authenticated. For example, a large number of time inquiries and corresponding time responses may be sent from a large number of communication units via a shared communication channel. The time inquiries may for example be received by all communication units connected to the communication channel. The identification feature makes it possible for only that communication unit with which time synchronization is to take place to send a time response. For example, all communication units receive the sent time response. The identification feature enables the respective communication unit that sent the corresponding time request to determine that the received time response corresponds to the previously sent time request. The benefit may be that a large number of communication units may be synchronized via a shared communication channel, with a clear assignment of the respective synchronization messages being made possible.

According to some embodiments, a wired network is used as the communication channel. The wired network comprises at least one component with a functional safety level that is below a functional safety level required by the function of the first communication unit security level. For example, the wired network is a CAN bus or an Ethernet network of a vehicle or a motor vehicle. It is possible that the vehicles communication channel between two communication units does not consistently have a functional reliability level in which a temporal synchronization with a predetermined synchronization accuracy would always be guaranteed, in other words that the communication channel is not trustworthy. The benefit may be that, according to the method, it can be determined if, for example, a required predetermined synchronization accuracy is present in the time synchronization via the wired network.

Another exemplary aspect relates to a method for determining a synchronization accuracy of a time synchronization of a first communication unit, a time request from the first communication unit being received at a corresponding instant of time of reception at a second communication unit. After the time request has been received, the second communication unit may send a corresponding time response at a corresponding instant of time of transmission, the time response comprising information relating to the instant of time of reception and the instant of time of transmission. For example, the information regarding the instant of time of reception and the instant of time of transmission represents the dwell time described above. It is thus possible for the time response to be sent, for example, with a synchronization time specification for the first communication unit and a dwell time, so that the first communication unit may determine the synchronization accuracy more precisely using the dwell time. The communication unit sending the time response may be configured to set the instant of time of transmission of the time response before sending the time response and to send the time response exactly (for example, exactly with regard to a temporal resolution of the time information of the communication unit) to the first communication unit at the set time of sending. The benefit of this may be that the synchronization accuracy may be determined more precisely by providing the information on the dwell time.

In some embodiments, the time response is provided with an identification feature corresponding to an identification feature of the time request. In other words, the received time request may contain an identification feature and the communication unit may send the time response with a corresponding identification feature. In a beneficial manner, the corresponding identification features may offer to assign the time response to the time request.

According to some embodiments, security against manipulation of the time response and/or the time request is optionally increased by using at least one cryptographic method. The respective messages may be encrypted so that only the communication units involved may read out the content of the messages. The messages may have digital signatures, for example, which make it possible to use only messages from authenticated communication units. For example, a time request may be sent to the second communication unit, with the time request also being able to be received by other units. The cryptographic method may ensure that only a time response from the second communication unit is used for synchronization, whereas manipulated time responses from other units can be ignored. It is also possible for the time response to be encrypted using a symmetric or an asymmetric encryption method. For this purpose, for example, the first communication unit and the second communication unit know the respective cryptographic keys of the respective other communication unit and/or are stored in a respective memory of the communication units. In order to increase security, each synchronization-pair may beneficially use specially assigned cryptographic keys. A digital signature may be attached to the time response and/or the time request, which signature was calculated according to a cryptographic method. The digital signature is about a message authentication code. For example, the security against manipulation of the time request may be increased alternatively or additionally in the same way by a cryptographic method.

Alternatively or additionally and in some embodiments, a checksum, e.g. adapted to the respective message, may be appended to the time request and/or the time response, by means of which checksum it may be determined if a respective time request or time response was actually sent by the respective communication unit. The benefit here may be that the security of the method against manipulation may be increased by using cryptography.

Another exemplary aspect relates to a computer program for carrying out one of the methods described above or below. Such a method may be carried out by the computer program when the computer program is running, for example, on a computer, a processor or a programmable hardware component.

Another exemplary aspect relates to a communication unit as described above or below. The communication unit can, for example, send and/or receive a time request and/or send and/or receive a time response. The communication unit is designed to be connected to a communication channel. The communication unit has at least one timer and is also set up to carry out one or more of the methods as described herein. The communication unit may be, for example, an electronic device, a mobile device, a computer or a cell phone. The communication unit may also be a sensor module, a control device, a computing unit or an on-board computer of a vehicle. For example, the communication unit is an electronic vehicle module of an on-board network.

Another exemplary aspect relates to a motor vehicle with at least one communication channel, the motor vehicle comprising at least one communication unit as discussed herein. The motor vehicle may be a vehicle in the sense of the preceding description. The motor vehicle may be a motorized, mobile means of transport for the transport of people and/or goods, for example a land vehicle. The motor vehicle may be, for example, a passenger car, a truck or a motorized two-wheeler. The motor vehicle may for example be designed to enable autonomous and/or partially autonomous or partially automated driving, for example using communication units formed by sensors and/or control devices.

The present discussion also includes embodiments of the communication unit and the motor vehicle comprising one or more features as described in the preceding in connection with the embodiments of the method. For this reason, the corresponding embodiments of the communication unit and of the motor vehicle are not described again here, but rather reference is made to the corresponding combinations.

In the following, further exemplary embodiments will now be described in more detail with reference to the accompanying drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows an exemplary flow chart of a method 100 for determining a synchronization accuracy of a time synchronization of a first communication unit. The method 100 comprises sending 110 a time request via a communication channel at a corresponding instant of time of transmission from the first communication unit to a second communication unit and a corresponding receiving 120 of a time response at a corresponding instant of time of reception at the first communication unit, the time response including a synchronization time specification of the second communication unit. The method 100 further comprises determining 130 the synchronization accuracy based on the instant of time of transmission and the instant of time of reception.

For example, the method 100 may be used in a vehicle. For vehicle functions such as automated driving and its sub-functions (e.g. sensor data fusion) it may be necessary to synchronize several control units on the same time base. From the requirements of functional safety and security (e.g. security against manipulation) it may be deduced that this time synchronization must be implemented in a trustworthy manner, although the communication channels between the affected control units, e.g. cannot be considered trustworthy. This means that unpredictable changes or delays may occur. This may either be due to deficits in the implementation (e.g. no ASIL-compatible implementation according to ISO26262, ISO: International Organization for Standardization) or deliberately e.g. by an attack on the vehicle network.

Consequently, in terms of functional safety, there may be a requirement that the non-availability of a trustworthy synchronization must be recognized in an ASIL-compatible manner within a specified time, that the synchronization accuracy must lie within a specified range and e.g. must be recognizable in ASIL-compatible quality, if this is not the case. However, this does not necessarily mean that the availability of the time synchronization may or must always be guaranteed.

In terms of security, it may be required that the time synchronization is subject to the goal of protection of authenticity and integrity. This means, for example, that errors effected by deliberate manipulation may be detected on the communication channel.

An benefit of the method 100 may be that the security requirements are not transferred to the communication channel. The communication channel may thus be implemented in a less complex and/or more cost-effective manner. Instead, the properties of the communication channel in terms of the instant of time of transmission and corruption of the transmitted content are monitored and errors that occur may be detected. It is also possible to pass these monitored properties on to functions that use them.

The method 100 according to the present embodiment is based e.g. on a master-slave principle. This may mean that there is a distribution of roles according to which a master (for example the second communication unit) is the owner of a time base to which one or more slaves (for example a first communication unit) synchronize.

Figure 2:
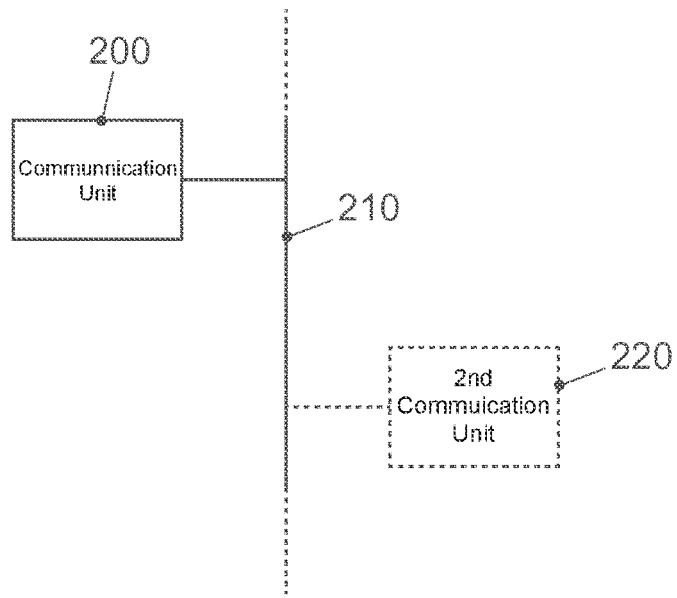
FIG. 2 shows an exemplary schematic representation of a communication unit which is connected to a communication channel.

FIG. 2 shows a schematic illustration of a communication unit 200 which is connected to a communication channel 210, which is partially shown in FIG. 2. For example, the communication unit 200 is a first communication unit. A second communication unit 220 may optionally be connected to the communication channel 210. For example, the first communication unit 200 may be synchronized with the second communication unit 220 over time. The first communication unit 200, for example as a slave, may adapt its time specification to a time specification of a master.

Figure 3:
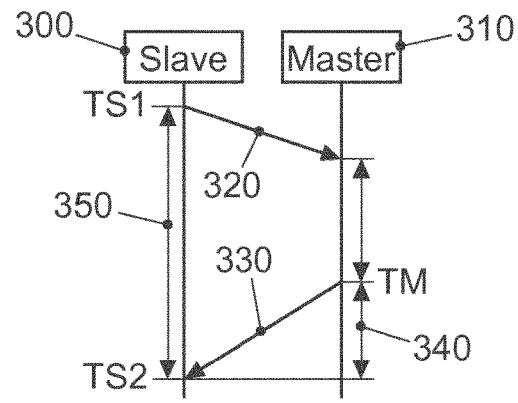
FIG. 3 shows an example of synchronization between a slave and a master.

FIG. 3 shows an example of a synchronization between a slave 300 and a master 310. The master (for example a control unit of a vehicle) and slave (for example a sensor of a vehicle) are connected to one another via a communication channel (not shown). The communication channel may consist of any combination of e.g. switched ethernet networks, CAN networks or Ethernet networks with bus topology, switches, routers, gateways, etc., whereby one or more elements from the line may be classified as untrustworthy. The communication controller (e.g. Ethernet MAC (Media Access Control)) apply e.g. as part of the communication channel and are in the first instance e.g. classified as untrustworthy. It is for example assumed that every master and every slave has a trustworthy (e.g. ASIL-compatible and tamper-proof) local clock, which e.g. is strictly monotonically increasing, may have a clock accuracy in a specified range (e.g. +−100 ppm), may have a finer or equal resolution than a specified value (e.g. 1 ns) and/or may have a greater or equal reading accuracy than a specified value (e.g. 1 ns). Furthermore, e.g. the assumption that the required software in the master and the slaves is implemented in a trustworthy manner (ASIL-compatible and tamper-proof).

The method 100 is based on the challenge-response-principle, according to which each slave (e.g. slave 300) periodically sends a time request 320 (or a request 320) to the master 310 in a predetermined interval, wherein on the request 320 the master 310 replies with a time response 330 (or a response 330). The request 320 may be sent by the slave 300 at a instant of time TS1 of transmission and the response 330 may be received at an instant of time TS2 of reception at the slave 300.

The resulting response 330 is designed in such a way that the slave 300 may uniquely assign the response to the causing request 320 (for example by means of an identification feature). The reason for this is that it cannot be ruled out that a request or response will be delayed indefinitely in an untrustworthy communication channel. This may be implemented, for example, in that each request contains an identifier (identification feature) which ensures that it is only used once per slave within a driving cycle (if method 100 is used in a vehicle, for example) or that it is sufficiently improbable that it is used more than once. The master may transfer this identifier from the request to the response and also apply an "XOR" (exclusive or) operation with a unique individual value, whereby it may be ensured that this value is known (possibly exclusively) to the two participants involved. This prevents e.g. the case that a seemingly valid response to a request is unintentionally generated due to an error in the communication channel.

In addition, the authenticity of the master 310 and/or the integrity of the message, such as the response 330, may be guaranteed by expanding the method described above. This is achieved in that the master 310 calculates a digital signature over the entire content of the response 330 by a suitable cryptographic method, which is attached to the response 330 (e.g. a message authentication code). Since e.g. only the master 310 and, depending on the method, also the slave 300 knows the underlying secret, the slave 300 may e.g. may be clearly identified as the sender of the response or it may be recognized whether the response 330 was willfully changed during transmission via the untrustworthy communication channel. A beneficial implementation of the method could use AES-256 (Advanced Encryption Standard) as a cryptographic method for calculating the digital signatures in addition to others. When using a symmetrical cryptographic procedure, it may be advisable to use a separate secret (key) for each master-slave pair. The authenticity and integrity of the request 320 may optionally be ensured using the same method.

Sometimes the cryptographic method used may not be suitable for ensuring the integrity of the content of the messages (for example the time response and the time request) in terms of functional safety. Then e.g. in addition, a CRC (cyclic redundancy check) checksum over the contents of the messages may be calculated and attached. If no digital signature is used at all, the use of the checksum may be essential for achieving the objectives of functional safety. If no checksum is used, a "Checksum" field in the request and in the response may be filled with the information "0x00". If no digital signature is used, a "Signature" field in the request and in the response may be filled with "0x00".

The master 310 may record a time stamp TM (for example as synchronization time information) on its timer, for example a local trustworthy clock, at the latest possible time before it sends the response 330, and adds e.g. this time stamp in a suitable representation in the response 330 (e.g. 64-bit nanosecond counter since start). It may be ensured that the value of the time stamp TM taking into account the resolution and the reading accuracy of the local clock of the master e.g. before the time at which the response is sent.

For time synchronization it may be necessary to generate an event that may be observed by all synchronization partners, with the master 310 notifying the slave 300 of the time at which the event took place according to its local clock and the slave 300 also records at which time according to its local clock the event was observed. In the case of time synchronization via a communication channel, the event typically represents the transmission of a message, which in this case is the response 330 of the master 310. It is possible that the slave 300 perceives the event (reception of the response) delayed by an unknown duration 340 (response network delay) via the untrustworthy communication channel. The response network delay 340 is the actual time between sending the response and receiving the response.

The response network delay in the case of an untrustworthy communication channel may theoretically be any size. The response network delay may be a reason for the synchronization failure. For example, the response network delay itself cannot simply be determined by slave 300. Instead, the slave records the time stamp TS1 according to its local clock at the latest possible time before sending the request, as well as the time stamp TS2 at the earliest possible time after receiving the response. From the time stamps TS2 and TS1, the slave calculates a round trip time 350 and assumes that the response network delay 340 is always less than or at most equal to the round trip time 350.

Figure 4A:
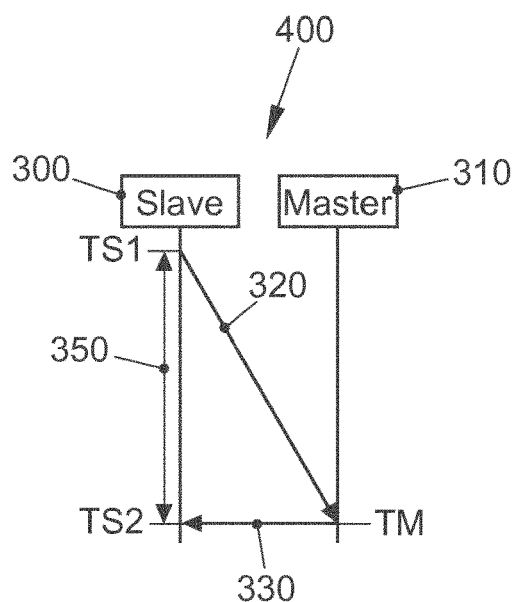
FIGS. 4a, 4b shows examples of synchronization errors in a time synchronization.
Figure 4B:
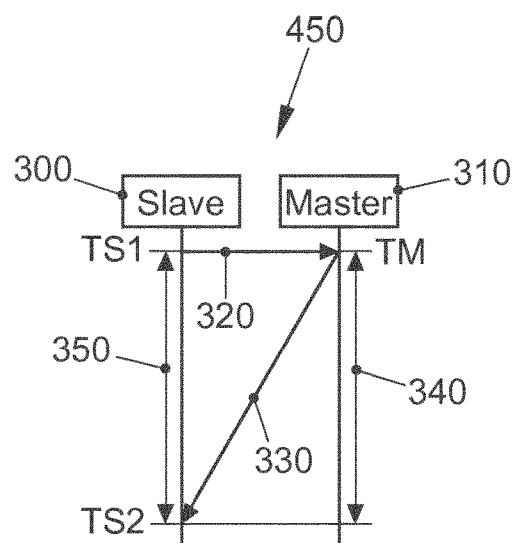

FIGS. 4a and 4b show examples 400, 450 of synchronization errors that may occur, for example, due to the response network delay 340, in the case of time synchronization.

With the help of the three time information items TS1, TS2 and TM, the slave 300 may form the following linear interpolation function, which allows the slave to calculate at any instant of time (ts, time slave) according to its local clock the time according to the clock of the master (tm, time master):

$tm(ts)=(ts-TS2)+TM-RND$.

However, the slave cannot make any statement about the instant of time TM within the interval TS1 to TS2. This in a first extreme case analysis according to example 450 leads to the assumption that response network delay 340 is equal to round trip time 350. This means that TM was recorded at the same time as TS1. According to example 400, another conceivable extreme case would be that the response network delay (not shown there) assumes the value 0 and TM was recorded at the same time as TS2. This results in the following two interpolation functions, the results of which differ by the round trip time (TS2-TS1), which at the same time also means a maximum deviation or a maximum synchronization error, e.g. represents the worst case error. According to example 450, a maximum response network delay (RND_MAX) equal to the round trip time (RTT) may result. According to example 400, a minimum response network delay (RND_MIN) of 0 may result. The worst case error thus corresponds to the round trip time RTT.

Theoretically, the slave 300 may select any value for the response network delay (RND) from the interval 0 to RTT for the linear interpolation function and may thereby e.g. determine the location of the error (e.g. depending on a function to be executed). If the slave 300 uses the value 0, this causes its synchronized clock to advance by 0 to a maximum of RTT compared to the master 310. If the slave 300 alternatively uses the value RTT, this causes its synchronized clock to lag behind the master 310 by 0 to a maximum of RTT. Depending on the requirements of the functions that use time synchronization, it is possible to set the value for RND appropriately. In order to achieve the required synchronization accuracy in a trustworthy manner, the round trip time must e.g. be less than or equal to a predetermined limit value RTT MAX, e.g. 5 ms. If the round trip time exceeds the value of RTT MAX, it may be signaled to the using function that the time synchronization cannot provide the required properties (with regard to accuracy) at the given point in time. Alternatively, the time synchronization of the using function may also provide the current synchronization accuracy (worst case error) in the form of the round trip time. As a result, the resulting behavior may also be determined by the using function, with different functions being able to implement different behavior. In one example, TS1 may correspond to 10 ms (time specification of slave 300), TS2 12 ms (time specification of slave 300) and TM 16 ms (time specification of master 310). The slave 300 may calculate the master time as follows: tm (13 ms)=(13 ms−12 ms)+16 ms−RND. In a first extreme case, this means tm (13 ms)=(13 ms−12 ms)+16 ms−2 ms=15 ms (taking into account a worst case error of 2 ms. In a second extreme case, this means tm (13 ms)=(13 ms−12 ms)+16 ms−0 ms=17 ms. An inaccuracy of 2 ms may occur.

Figure 5A:
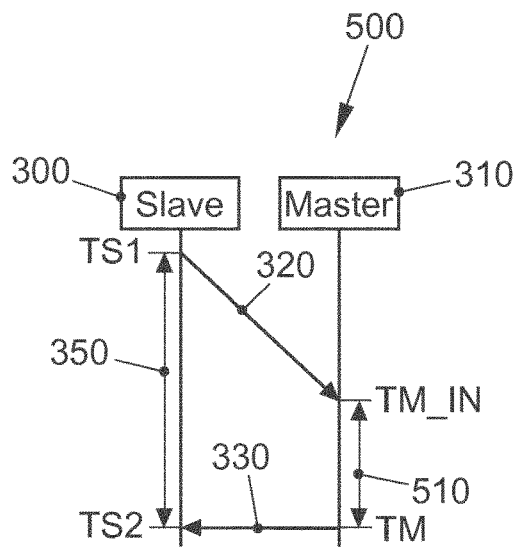
FIGS. 5a, 5b shows examples for determining a synchronization accuracy using a dwell time.
Figure 5B:
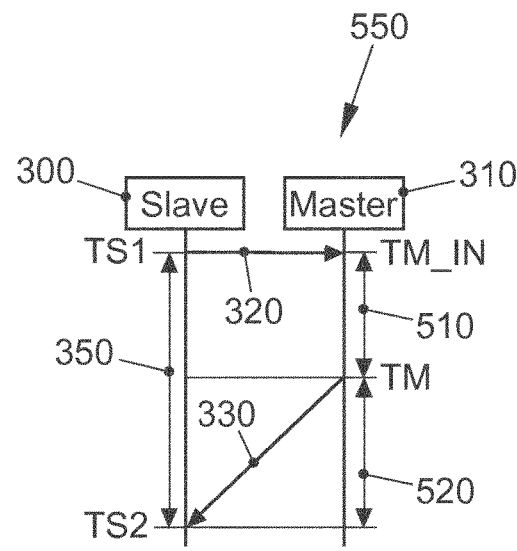

FIGS. 5a and 5b show examples 500, 550 for determining a synchronization accuracy using a dwell time 510. In a possible variant of the method, the synchronization accuracy may be improved (for example, the worst case error may be reduced) by the master 310 additionally adding a time stamp TM_IN at the earliest possible instant of time after receipt of request 320. The master integrates this time stamp TM_IM into its response 330 and thus enables the slave to determine the dwell time 510, for example the master residence time (MRT), which the master e.g. as processing time for the request 330. It may be that MRT=TM−TM_IN. If the slave 300 knows the master residence time 510, it may make the assumption for the response network delay that the response network delay cannot be greater than RTT-MRT. This assumption is derived from an analogous extreme case study. This improves the determination of the synchronization accuracy by the value MRT.

According to example 550, it is the maximum response network delay 520 (RND_MAX)=RTT−MRT. According to example 500, it is the minimum response network delay (RND_MIN)=0. The worst case error may thus be determined by RTT 350−MRT 510. In one example, TS1 on slave 300 may be 10 ms and TS2 on slave 300 may be 12 ms and TM_IN on master 310 may be 15 ms and TM on master 310 may be 16 ms. The slave 300 may thus calculate e.g. tm (13 ms)=(13 ms−12 ms)+16 ms−RND. The following may apply for MRT 510: 16 ms−15 ms=1 ms. According to example 550, it is tm (13 ms)=(13 ms−12 ms)+16 ms−1 ms=16 ms. According to example 500, it is tm (13 ms)=(13 ms−12 ms)+16 ms−0 ms=17 ms. A worst case error and thus the inaccuracy of the synchronization may thus be determined beneficially reduced to 1 ms. The synchronization accuracy may therefore be determined more precisely.

Figure 6:
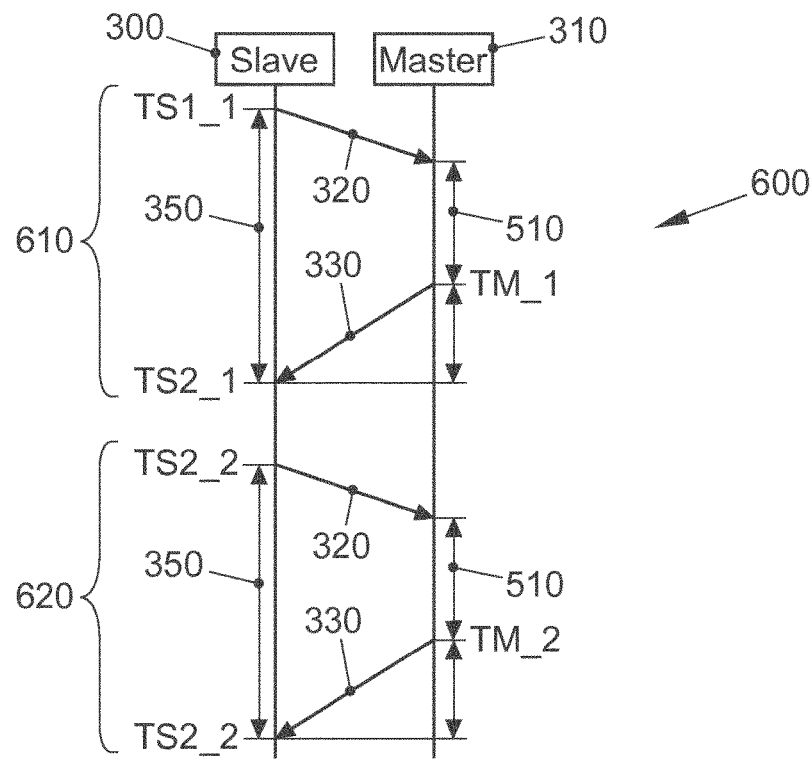
FIG. 6 shows an example of a method with determining a deviation rate.

FIG. 6 shows an example of a method for determining 600 a deviation rate. The clocks in the master 310 and slave 300 may each have a limited clock accuracy (e.g. 100 ppm). It may be appreciated that the clocks in the slaves behave as exactly as possible like the clock in the master. To achieve this, the slaves may first determine the difference between their own cycle and the master's cycle. In the second step, the slaves may adapt their own cycle to the master's cycle determined by the difference. It is possible to use the time stamps from two synchronization intervals 610, 620 to make a rate adjustment in slave 300. For this purpose, the slave may determine the ratio of the master's clock cycle and its own (rate ratio, RR) using the following formula: RR=(TM_2−TM_1)/(TS2_2−TS2_1). The rate ratio may be taken into account by the slave during synchronization in the linear interpolation function in the following way: tm (ts)=(ts−TS2)*RR+TM−RND. In order to minimize the influence of absolute errors when recording the time stamps TM_* and TS*, it is possible to select the time interval between the synchronization intervals 610, 620 as large as possible.

In principle, it is possible to synchronize several time bases between participants within a network. This means that there may basically be several masters that may make their own time base or time information available to one or more slaves. At the same time, a slave may synchronize itself to one or more time bases of one or more masters. The different time bases may be identified via a "Time Base" field within the request 320 or the response 330. It may be ensured that the identifiers for the time bases are unique within a network.

For certain functions it may not be permissible if the synchronized clock is not strictly monotonously increasing. Setting the clock in slave 300 to a value specified by master 310 (e.g. the synchronization time specification) can, however, lead to such a jump. Therefore, instead of a sudden correction of the clock to be synchronized after receiving the response, the synchronization error may be corrected gradually with the aid of a rate adjustment. For this purpose, when receiving the response, slave 300 may determine both the current time of the synchronized clock according to the linear interpolation function from the previous synchronization interval and the current time of the synchronized clock according to the linear interpolation function from the current synchronization interval. The difference between these two values e.g. represents a synchronization error E to be corrected, with E=tm_2(ts)−tm_1(ts). Instead of a sudden correction by the value E by substituting tm_1(ts) with tm_2(ts), expectations may be formed about the next synchronization point in time, which is likely to take place after a cycle time T_SYNC has elapsed. The slave may pursue the goal of eliminating the synchronization error E to be corrected by this point in time, for example in accordance with tm_2(ts)=(ts−TS2_2)+TM_2−RND_2−E*((ts−TS2_2)/T_SYNC).

The present teaching also relates to a method for realizing a trustworthy time synchronization via untrustworthy communication channels.

With the method, e.g. the requirements (e.g. functional safety) on the network components involved may be reduced e.g. from ASIL B to QM and thereby considerable costs may be saved. One benefit may be the implementation of a trustworthy time synchronization with regard to functional safety and security.

The method presented is universal and may be used wherever reliable time synchronization is required. In this context, reliability e.g. may mean suitable for ASIL B according to ISO26262 and safe against willful manipulation in terms of security. For example, in a vehicle it cannot necessarily be assumed that the communication channel between the control units may be implemented in a trustworthy manner. This applies e.g. towards Ethernet networks whose switches do not implement their functionality in an ASIL-compatible manner. An ASIL B-compatible implementation of all network components involved would be associated with considerable additional costs. Therefore, under certain circumstances, no automotive-compatible solutions have been developed, e.g. are certified according to ISO26262. In addition, implementing the communication channel (cables, plugs, etc.) in a trustworthy quality would be very time-consuming and expensive.

Further exemplary embodiments are computer programs for carrying out one of the methods described herein when the computer program runs on a computer, a processor, or a programmable hardware component. Depending on the specific implementation requirements, embodiments may be implemented in hardware or in software. The implementation may be carried out using a digital storage medium such as a floppy disk, a DVD, a Blu-Ray disk, a CD, a ROM, a PROM, an EPROM, an EEPROM or a FLASH memory, a hard disk or other magnetic memory or optical memory, on which electronically readable control signals are stored, which may interact or cooperate with a programmable hardware component in such a way that the respective method is carried out.

A programmable hardware component may be a processor, a computer processor (CPU=Central Processing Unit), a graphics processor (GPU=Graphics Processing Unit), a computer, a computer system, an application-specific integrated circuit (ASIC=Application-Specific Integrated Circuit), an integrated Circuit (IC=Integrated Circuit), a one-chip system (SOC=System on Chip), a programmable logic element or a field-programmable gate array with a microprocessor (FPGA=Field Programmable Gate Array).

The digital storage medium may therefore be machine readable or computer readable. Some exemplary embodiments thus include a data carrier that has electronically readable control signals that are able to interact with a programmable computer system or a programmable hardware component in such a way that one of the methods described herein is carried out. One embodiment is thus a data carrier (or a digital storage medium or a computer-readable medium) on which the program for carrying out one of the methods described herein is recorded.

In general, embodiments may be implemented as a program, firmware, computer program or computer program product with a program code or as data, wherein the program code or the data is effective or are to carry out one of the methods when the program is on a processor or a programmable hardware component runs. The program code or the data can, for example, also be stored on a machine-readable carrier or data carrier. The program code or the data may be present as source code, machine code or bytecode, as well as other intermediate code, among other things.

The above-described embodiments are merely illustrative of the principles of the present invention. It is to be understood that modifications and variations of the arrangements and details described herein will be apparent to other skilled persons. It is therefore intended that the invention be limited only by the scope of the following claims and not by the specific details presented herein with reference to the description and explanation of the exemplary embodiments.

LIST OF REFERENCE NUMERALS

100 Procedures
110 Sending a Time Request
120 Receiving a Time Response
130 Determining a synchronization accuracy
200 Communication unit
210 Communication channel
220 Second communication unit
300 Slave
310 Master
320 Time request
330 Time response
340 Response Network Delay
350 Round trip time
400 First example
450 Second example
500 First example
510 Length of stay
520 Maximum response network delay
550 Second example
600 Determination of a deviation rate
610 First synchronization interval
620 Second synchronization interval The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining a synchronization accuracy of a time synchronization of a first communication unit, the method comprising:
   transmitting a time request via a communication channel at a corresponding instant of time of transmission from the first communication unit to a second communication unit;
   receiving a time response at a corresponding instant of time of reception at the first communication unit, wherein the time response comprises a synchronization time specification of the second communication unit;

determining the synchronization accuracy based on the instant of time of transmission and the instant of time of reception; and using the synchronization time specification of the second communication unit for executing a function of the first communication unit depending on the synchronization accuracy; wherein a wired network is used as the communication channel which wired network comprises at least one component with a functional safety level that is below a functional safety level that is required by the function of the first communication unit.

2. A non-transitory medium with a computer program for carrying out the method of claim 1 when the computer program is executed on a computer, a processor, or a programmable hardware component.

3. The method of claim 1, wherein a synchronization error determined from the synchronization accuracy is taken into account for the time synchronization as a function of the function to be executed.

4. The method of claim 3, wherein a new time request is sent in the case of the synchronization accuracy being less than a synchronization accuracy required for the function to be executed.

5. The method of claim 3, wherein, to determine the synchronization accuracy, a time period between receiving the time request and sending the time response at the second communication unit is taken into account, which time period is inserted as a dwell time into the time response, and/or wherein an instant of time of reception of the time request and an instant of time of transmission of the time response are taken into account, which are inserted into the time response.

6. The method of claim 1, wherein a new time request is sent in the case of the synchronization accuracy being less than a synchronization accuracy required for the function to be executed.

7. The method of claim 6, wherein, to determine the synchronization accuracy, a time period between receiving the time request and sending the time response at the second communication unit is taken into account, which time period is inserted as a dwell time into the time response, and/or wherein an instant of time of reception of the time request and an instant of time of transmission of the time response are taken into account, which are inserted into the time response.

8. The method of claim 1, wherein in case of a deviation of the synchronization time specification of the second communication unit from a time specification of the first communication unit the time specification of the first communication unit is gradually adapted the synchronization time specification.

9. The method of claim 1, wherein one or more of respective identification features, checksums, and signatures, by which a time response is clearly assigned to a corresponding time request, are attached to the time request and the time response.

10. The method of claim 1, wherein, to determine the synchronization accuracy, a time period between receiving the time request and sending the time response at the second communication unit is taken into account, which time period is inserted as a dwell time into the time response, and/or wherein an instant of time of reception of the time request and an instant of time of transmission of the time response are taken into account, which are inserted into the time response.

11. The method of claim 1, wherein, to determine the synchronization accuracy, a time period between receiving the time request and sending the time response at the second communication unit is taken into account, which time period is inserted as a dwell time into the time response, and/or wherein an instant of time of reception of the time request and an instant of time of transmission of the time response are taken into account, which are inserted into the time response.

12. The method of claim 1, wherein manipulation security of the time response and/or the time request is increased by using at least one cryptographic method, wherein the respective message is signed with a cryptographic method.

13. The method of claim 1, wherein a rate variation of a timer of the first communication unit compared to a timer of the second communication unit is compensated by using a deviation rate, wherein the deviation rate is determined based on at least one further time-delayed sending of a time request and a corresponding further reception of a time response.

14. A communication unit for connecting to a communication channel, wherein the communication unit comprises at least one timer and is further configured to execute the method of claim 1.

15. A motor vehicle with at least one communication channel, wherein the motor vehicle comprises at least one communication unit of claim 14.

16. The method of claim 1, wherein a plurality of time requests is sent from the first communication unit via the communication channel to a corresponding plurality of communication units, which are configured accordingly at least with respect to of sending the time response of the second communication unit.

17. A method for determining a synchronization accuracy of a time synchronization of a first communication unit, the method comprising:

transmitting a time request via a communication channel at a corresponding instant of time of transmission from the first communication unit to a second communication unit;

receiving a time response at a corresponding instant of time of reception at the first communication unit, wherein the time response comprises a synchronization time specification of the second communication unit;

determining the synchronization accuracy based on the instant of time of transmission and the instant of time of reception; and using the synchronization time specification of the second communication unit for executing a function of the first communication unit depending on the synchronization accuracy; wherein a synchronization error determined from the synchronization accuracy is taken into account for the time synchronization as a function of the function to be executed.

* * * * *